(12) United States Patent
Park

(10) Patent No.: US 11,434,799 B2
(45) Date of Patent: Sep. 6, 2022

(54) LEAN-BURN ENGINE AFTER-TREATMENT SYSTEM

(71) Applicants: HYUNDAI MOTOR COMPANY, Seoul (KR); KIA MOTORS CORPORATION, Seoul (KR)

(72) Inventor: Ki-Ho Park, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/797,755

(22) Filed: Feb. 21, 2020

(65) Prior Publication Data

US 2021/0148270 A1 May 20, 2021

(30) Foreign Application Priority Data

Nov. 20, 2019 (KR) .................. 10-2019-0149494

(51) Int. Cl.
| | |
|---|---|
| F01N 3/10 | (2006.01) |
| F01N 3/20 | (2006.01) |
| F01N 13/08 | (2010.01) |
| F01N 3/28 | (2006.01) |

(52) U.S. Cl.
CPC .......... *F01N 3/2066* (2013.01); *F01N 3/101* (2013.01); *F01N 3/2803* (2013.01); *F01N 13/08* (2013.01); F01N 2470/02 (2013.01); F01N 2510/02 (2013.01)

(58) Field of Classification Search
CPC ...... F01N 3/2066; F01N 3/2803; F01N 13/08; F01N 13/009; F01N 13/0097; F01N 13/017; F01N 13/141; F01N 2240/25
See application file for complete search history.

(56) References Cited

U.S. PATENT DOCUMENTS

| | | | | |
|---|---|---|---|---|
| 7,892,508 B2* | 2/2011 | Katoh | ...................... | F01N 3/208 423/213.2 |
| 2004/0159096 A1* | 8/2004 | Yasui | ..................... | F01N 3/2066 60/286 |
| 2010/0043402 A1* | 2/2010 | Perry | ................. | B01D 53/9495 60/285 |
| 2010/0107606 A1* | 5/2010 | Narayanaswamy | ......................... | F01N 13/0093 60/274 |
| 2012/0055088 A1* | 3/2012 | Steele | .................... | C10K 1/005 48/89 |
| 2012/0060472 A1 | 3/2012 | Li | | |

(Continued)

*Primary Examiner* — Jason D Shanske
(74) *Attorney, Agent, or Firm* — Lempia Summerfield Katz LLC

(57) ABSTRACT

A lean-burn engine after-treatment system includes: a multiple catalyst bed including an APC catalyst housing, an SCR catalyst housing that surrounds the APC catalyst housing, and a CUC housing that surrounds the SCR catalyst housing; a first housing surrounding the multiple catalyst bed; a double pipe including a first pipe that is connected to a front end of the APC catalyst housing and a rear end of a TWC housing, and a second pipe that surrounds the first pipe and is connected to the first housing; and an exhaust-gas treatment unit connected to a rear end of the CUC housing. At least one perforation is formed in each of inner and outer surfaces of the first pipe, the APC catalyst housing, and the SCR catalyst housing, and an inner surface of the CUC housing.

18 Claims, 2 Drawing Sheets

(56) References Cited

U.S. PATENT DOCUMENTS

2015/0174529 A1\* 6/2015 Irisawa .................. F01N 3/021
       422/114
2016/0230632 A1\* 8/2016 Smith .................. F01N 13/011

\* cited by examiner

LEAN-BURN ENGINE AFTER-TREATMENT SYSTEM

CROSS-REFERENCE TO RELATED APPLICATION

This application claims under 35 U.S.C. § 119(a) the benefit of priority to Korean Patent Application No. 10-2019-0149494 filed on Nov. 20, 2019, the entire contents of which are incorporated herein by reference.

BACKGROUND

(a) Technical Field

The present disclosure relates to a structure of a lean-burn engine after-treatment system. More particularly, the disclosure relates to the arrangement of catalyst housings.

(b) Background Art

A lean-burn engine for improving fuel efficiency produces ammonia ($NH_3$) while changing fuel injection conditions from a lean mode to a slightly rich mode so as to purify nitrogen oxide ($NO_x$) passing through an ammonia production catalyst (APC) (i.e., a catalyst that stores produced $NH_3$) in a lean mode using a selective catalytic reduction (SCR) catalyst. After the produced $NH_3$ is stored in the APC, it is supplied to the SCR catalyst when necessary, thus producing a purifying reaction with $NO_x$. However, this is problematic in that carbon monoxide (CO) that is produced from a three-way catalyst (TWC) in the slightly rich mode and then introduced into the APC should be purified.

In order to purify CO, a clean-up catalyst (CUC) that purifies CO using low-temperature oxygen storage capacity (OSC) is applied after the SCR catalyst. Since a purifying reaction product of the CUC, namely, carbon dioxide ($CO_2$) interrupts the purifying reaction of the SCR catalyst, the CUC should be necessarily positioned behind the SCR catalyst. To be more specific, as the temperature of the CUC rises, the release amount of the low-temperature OSC of a carrier is increased, and a water gas shift reaction with CO is activated. In other words, as the temperature of the CUC rises, the release of the OSC is activated, so that the performance of purifying CO is increased. When $CO_2$ that is the product of the purifying reaction is introduced into the SCR catalyst, the $NH_3$—$NO_x$ purifying reaction of the SCR catalyst is interrupted, so that the CUC may not be located before the SCR catalyst so as to come into contact with high-temperature exhaust gas.

The SCR catalyst is changed in performance of occluding $NH_3$ in the carrier and performance of reacting $NO_x$—$NH_3$ depending on the temperature of the SCR catalyst. As the temperature rises, the performance of occluding $NH_3$ is reduced and the reaction with $NO_x$ is maximized at 250 to 400° C. Therefore, the temperature of the SCR catalyst needs to be at 250 to 400° C. However, since a pipe, a CUC housing, an exhaust system and a muffler should be located behind a SCR catalyst housing, the SCR catalyst should be inevitably located at a front of a vehicle on a vehicle package. Thus, the temperature of the SCR catalyst is set to be higher than 250 to 400° C.

SUMMARY OF THE DISCLOSURE

The present disclosure has been made in an effort to solve the above-described problems associated with prior art and to provide a lean-burn engine after-treatment system that allows the temperature of a selective catalytic reduction (SCR) catalyst to beat 250 to 400° C.

Another object of the present disclosure is to provide a lean-burn engine after-treatment system that is located behind an SCR catalyst but allows the temperature of a clean-up catalyst (CUC) to be higher than 250 to 400° C.

According to one aspect of the disclosure, the present disclosure provides a lean-burn engine after-treatment system including: a multiple catalyst bed including an ammonia production catalyst (APC) housing, an SCR catalyst housing that surrounds the APC housing, and a CUC housing that surrounds the SCR catalyst housing; a first housing surrounding the multiple catalyst bed; a double pipe including a first pipe that is connected to a front end of the APC housing and a rear end of a three-way catalyst (TWC) housing and a second pipe that surrounds the first pipe and is connected to the first housing; and an exhaust-gas treatment unit connected to a rear end of the CUC housing. At least one perforation may be formed in each of inner and outer surfaces of the first pipe, the APC housing, and the SCR catalyst housing, and an inner surface of the CUC housing.

The second pipe may include a first line extending in a direction parallel to a longitudinal direction of the first pipe, and a second line extending to have an increased diameter and connected to the first housing.

The perforation of the first pipe may be surrounded by the first line.

The exhaust-gas treatment unit may include an exhaust-gas inlet part connected to the rear end of the CUC housing, an exhaust-gas joining part, and an exhaust-gas outlet part.

The exhaust-gas inlet part may extend in a longitudinal direction of the CUC housing.

The exhaust-gas joining part may extend inwards in a direction perpendicular to a longitudinal direction of the exhaust-gas inlet part.

The exhaust-gas outlet part may extend in a direction parallel to the longitudinal direction of the exhaust-gas inlet part.

The exhaust-gas inlet part and the exhaust-gas joining part may be connected in a curved shape.

A mat of a mesh structure may be located on the perforation of the inner surface of the SCR catalyst housing or on the perforation of the inner surface of the CUC housing.

Each of the first pipe or the CUC catalyst housing may be made of an aluminum material.

A central axis of the perforation of the APC housing may coincide with that of the perforation of the inner surface of the SCR catalyst housing.

A size of the perforation of the APC housing may be equal to that of the perforation of the inner surface of the SCR catalyst housing.

A central axis of the perforation of the outer surface of the SCR catalyst housing may coincide with that of the perforation of the inner surface of the CUC catalyst housing.

A size of the perforation of the outer surface of the SCR catalyst housing may be equal to that of the perforation of the inner surface of the CUC housing.

Perforations may be formed in an entire region of the APC housing, the inner and outer surfaces of the SCR catalyst housing or the inner surface of the CUC housing.

The perforation of the APC housing, the perforation of the inner surface of the SCR catalyst housing, the perforation of the outer surface of the SCR catalyst housing or the perforation of the inner surface of the CUC housing may have inclined shapes.

The second pipe or the first housing may be surrounded by a heat insulating material.

The heat insulating material may be a silica material.

According to the present disclosure, the temperature of the SCR catalyst may be at 250 to 400° C.

According to the present disclosure, the temperature of the CUC may be at a temperature higher than 250 to 400° C.

DETAILED DESCRIPTION

Hereinafter, the present disclosure is described in detail. However, the present disclosure is not limited or restricted by the disclosed embodiments, and the objects and effects of the present disclosure may be naturally understood or more apparent from the following description. The objects and effects of the present disclosure are not limited by the following description. Further, in the description of the present disclosure, when it is determined that the related art of the present disclosure unnecessarily makes the gist of the present disclosure obscure, a detailed description thereof has been omitted.

Figure 1:
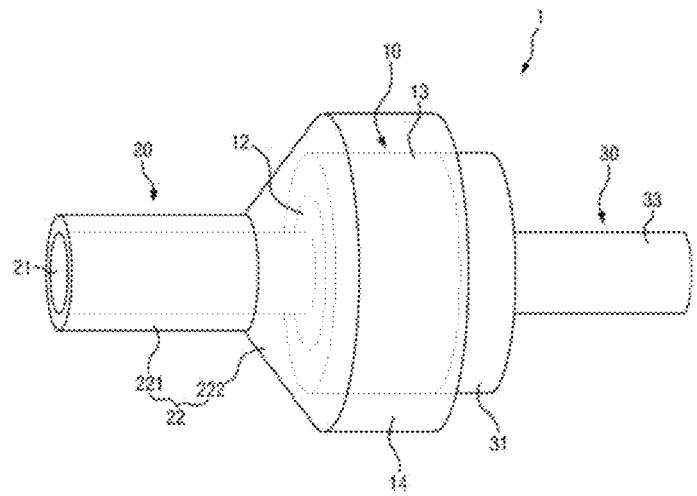
FIG. 1 is a side perspective view of a lean-burn engine after-treatment system according to the present disclosure.
Figure 2:
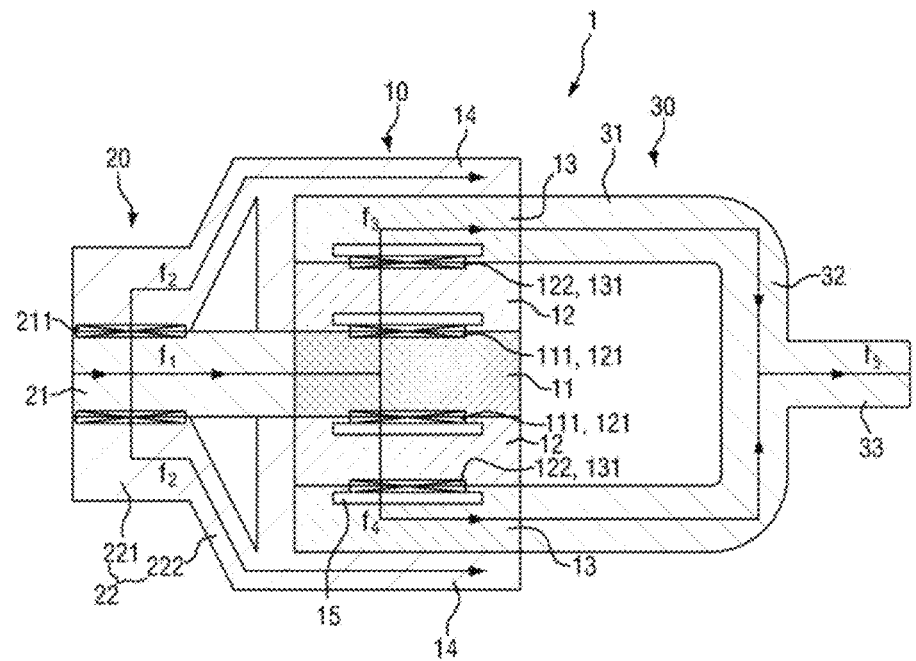
FIG. 2 is a sectional view of the lean-burn engine after-treatment system according to the present disclosure.

FIG. 1 is a side perspective view of a lean-burn engine after-treatment system 1 according to the present disclosure. FIG. 2 is a sectional view of the lean-burn engine after-treatment system 1 according to the present disclosure. Referring to FIGS. 1 and 2, the present disclosure is directed to the lean-burn engine after-treatment system 1. The system includes a multiple catalyst bed 10, a first housing 14, a double pipe 20, and an exhaust-gas treatment unit 30. The multiple catalyst bed 10 includes an ammonia production catalyst (APC) housing 11, a selective catalytic reduction (SCR) catalyst housing 12 that surrounds the APC housing 11, and a clean-up catalyst (CUC) housing 13 that surrounds the SCR catalyst housing 12. The first housing 14 surrounds the multiple catalyst bed 10. The double pipe 20 includes a first pipe 21 that is connected to a front end of the APC housing 11 and a rear end of a three-way catalyst (TWC) housing (not shown), and a second pipe 22 that surrounds the first pipe 21 and is connected to the first housing 14. The exhaust-gas treatment unit 30 is connected to a rear end of the CUC housing 13. One or more perforations 111, 121, 122 and 131 are formed in inner and outer surfaces of the first pipe 21, the APC housing 11 and the SCR catalyst housing 12, and an inner surface of the CUC housing 13.

The second pipe 22 may include a first line 221 extending in a direction parallel to a longitudinal direction of the first pipe 21, and a second line 222 extending to have an increased diameter and connected to the first housing 14. In one example, the perforation 211 of the first pipe 21 may be surrounded by the first line 221.

The exhaust-gas treatment unit 30 may include an exhaust-gas inlet part 31, an exhaust-gas joining part 32, and an exhaust-gas outlet part 33. The exhaust-gas inlet part 31 may be connected to the rear end of the CUC housing 13 and may extend in the longitudinal direction of the CUC housing 13. The exhaust-gas joining part 32 may extend inwards in a direction perpendicular to the longitudinal direction of the exhaust-gas inlet part. The exhaust-gas outlet part 33 may extend in the longitudinal direction of the exhaust-gas inlet part 31. Since flow interference occurs while exhaust gases are joined at the exhaust-gas joining part 32, the shape of an edge portion or a joined portion may be gently shaped so as to prevent back pressure and flow noise. In one example, the exhaust-gas inlet part 31 and the exhaust-gas joining part 32 may be connected in a curved shape.

A mat 15 of a mesh structure may be placed on the perforation 121 of the inner surface of the SCR catalyst housing 12 or on the perforation 131 of the inner surface of the CUC housing 13. The mat 15 may prevent the aging and the leakage of a carrier and a connection, which may occur when the exhaust gas passes through the perforation.

Hereinafter, the operation of the lean-burn engine after-treatment system 1 according to the present disclosure is described with reference to FIG. 2. First, the operation of the double pipe 20 is described. The exhaust gas passing through the TWC housing is introduced into the first pipe 21. The exhaust gas is separated into a flow1 ($f_1$) introduced into the APC housing 11 and a flow2 ($f_2$) introduced into the second pipe 22, and more specifically the first line 221, by the perforation 211 of the first pipe 21. The flow rate of the separated exhaust gas may be adjusted with the total area of the perforation 211, namely, the area and number of respective perforations 211. By way of example, if the total area of the perforation 211 is equal to or more than the sectional area of the first pipe 21, the flow rate of the flow1 ($f_1$) is equal to that of the flow2 ($f_2$). Meanwhile, the flow2 ($f_2$) introduced into the first line 221 passes through the second line 222 and then flows into the first housing 14.

The operation of the multiple catalyst bed 10 is as follows. After the flow1 ($f_1$) is introduced into the APC housing 11 of the multiple catalyst bed 10, the flow is separated into a flow3 ($f_3$) and a flow4 ($f_4$) by the perforation 111 of the APC housing 11. The flow3 ($f_3$) passes through the perforation 121 of the inner surface of the SCR catalyst housing 12, and then flows into the SCR catalyst housing 12. Subsequently, the flow3 ($f_3$) passes through the perforation 122 of the outer surface of the SCR catalyst housing 12 and the perforation 131 of the inner surface of the CUC housing 13, and then flows into the CUC housing 13. For reference, a stream of the flow4 ($f_4$) at the multiple catalyst bed 10 is equal to a stream of the flow3 ($f_3$). The temperature of the flow3 ($f_3$) is reduced while the flow passing through the catalyst housings 11, 12 and 13.

The operation of the exhaust-gas treatment unit 30 is as follows. Since no perforation is formed in the outer surface of the CUC housing 13, the flow3 ($f_3$) and the flow4 ($f_4$) are introduced into the exhaust-gas inlet part 31. At this time, the exhaust gases of the flow3 ($f_3$) and the flow4 ($f_4$) are exhaust gases that have undergone a purifying reaction with the APC, the SCR catalyst, and the CUC. These two exhaust gases are joined at the exhaust-gas joining part 32 to form a flow5 ($f_5$) and are discharged through the exhaust-gas outlet part 33 at the rear of the vehicle.

Unlike the related art, wherein the APC housing, the SCR catalyst housing, and the CUC housing form a serial structure, the present disclosure forms the catalyst housing in a parallel structure or a layered structure. As a space occupied by the lean-burn engine after-treatment system is reduced, the SCR catalyst housing may be located as near to the back of the vehicle as possible. Thus, the temperature of the SCR catalyst may be in the region (250 to 400° C.) of maximum purification performance.

According to the present disclosure, the high-temperature exhaust gas passing through the TWC housing may be separated into the flow1 ($f_1$) that is directly introduced into the APC housing 11 and the flow2 ($f_2$) that is finally introduced into the first housing 14 surrounding the CUC housing 13, thus directly transferring heat of the exhaust gas of the flow2 ($f_2$) to the CUC. Thus, the temperature of the CUC can be kept as high as possible. This prevents a problem where the temperature of the CUC may be reduced, as the after-treatment system according to the present disclosure, and particularly the SCR catalyst housing, is installed at the rear of the vehicle.

As the heat is transferred to the CUC, the temperature of the exhaust gas of the flow2 ($f_2$) is reduced. On the other hand, heat is continuously transferred to the exhaust gas of the flow1 ($f_1$) by the combustion of the engine. Since heat transfer and mixing between two exhaust gases occur in the perforation 211 of the first pipe 21, the temperature of the exhaust gas of the flow2 ($f_2$) may be elevated by the heat of the exhaust gas of the flow1 ($f_1$).

In one example, a lot of heat transfer is performed in the first pipe 21 and the CUC housing 13. The reason is as follows. In the case of the first pipe 21, the higher the heat transfer in the first line 221 of the first pipe 21 and the second pipe 22, the higher the temperature of the exhaust gas of the flow2 ($f_2$) introduced into the first housing 14 (i.e., the temperature of the exhaust gas of the flow1 ($f_1$) is reduced). In the case of the CUC housing 13, as more heat is transferred from the exhaust gas of the flow2 ($f_2$), the purifying performance is also increased. Therefore, according to an embodiment of the present disclosure, an aluminum material having high thermal conductivity and excellent corrosion resistance may be applied as the material of the first pipe 21 or the CUC housing 13. The aluminum material, in one example, may be SUS439.

Figure 3:
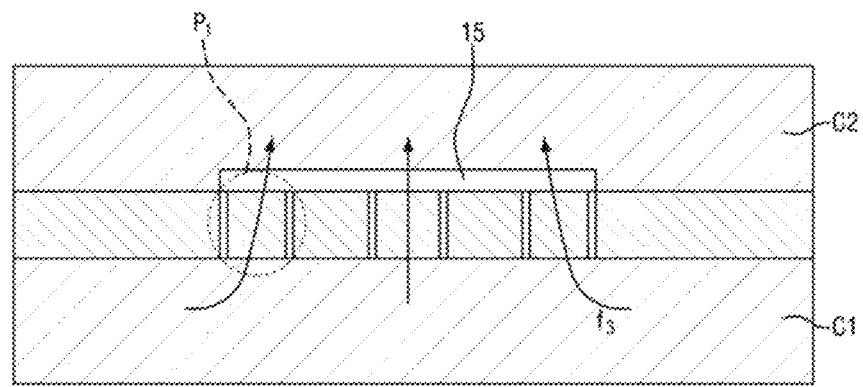
FIG. 3 illustrates an embodiment of a perforation in the lean-burn engine after-treatment system of the present disclosure.
Figure 4:
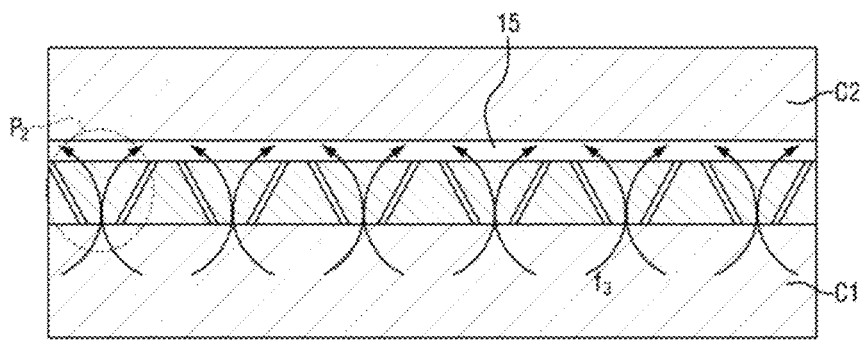
FIG. 4 illustrates another embodiment of the perforation in the lean-burn engine after-treatment system of the present disclosure.

FIG. 3 illustrates an embodiment of a perforation of the lean-burn engine after-treatment system of the present disclosure. FIG. 4 illustrates another embodiment of the perforation of the lean-burn engine after-treatment system of the present disclosure. In FIGS. 3 and 4, catalyst1 (C1), catalyst2 (C2), and the perforations ($P_1$) and ($P_2$) may be classified as follows. If the catalyst1 (C1) is the APC, the catalyst2 (C2) is the SCR catalyst, and the perforations ($P_1$) and ($P_2$) are shown as the perforation of the APC housing 11 being in contact with the perforation of the inner surface of the SCR catalyst housing 12. If the catalyst1 (C1) is the SCR catalyst, the catalyst2 (C2) is the CUC, and the perforations ($P_1$) and ($P_2$) are shown as the perforation of the outer surface of the SCR catalyst housing 12 being in contact with the perforation of the inner surface of the CUC housing 13.

Referring to FIG. 3, the perforation ($P_1$) may be formed in some of regions where two catalyst housings are adjacent. The central axes of the respective perforations formed in the two catalyst housings may coincide with each other, and the sizes (e.g. diameters) of the perforations may be equal to each other.

Referring to FIG. 4, the perforation ($P_2$) may be formed in all of the regions where the two catalyst housings are adjacent. The exhaust gas of the flow3 ($f_3$) may be uniformly distributed in the catalyst2 (C2) to improve the purifying performance of the catalyst2 (C2). The central axes of the respective perforations formed in the two catalyst housings may coincide with each other, and the perforations may have an inclined shape. The perforation may be shaped such that its sectional area increases towards the catalyst2 (C2).

This can minimize the amount of heat that is lost when the second pipe 22 and the first housing 14 come into contact with the air. Thus, the loss of heat transferred to the CUC is minimized. Therefore, according to another embodiment of the present disclosure, the second pipe 22 or the first housing 14 may be surrounded with a heat insulating material. In one example, the heat insulating material may be a silica material.

Although the present disclosure has been described with reference to specific embodiments shown in the drawings, it should be apparent to those having ordinary skill in the art that the present disclosure may be changed and modified in various ways without departing from the scope of the present disclosure. Therefore, the scope of the disclosure should not be limited to the above-described embodiments, and all changes that fall within bounds of the claims or equivalence of such bounds are intended to be embraced by the claims.

What is claimed is:

1. A lean-burn engine after-treatment system comprising:
a multiple catalyst bed including an ammonia production catalyst (APC) housing and an APC therein, a selective catalytic reduction (SCR) catalyst housing that surrounds the APC housing and includes a SCR catalyst therein, and a clean-up catalyst (CUC) housing that surrounds the SCR catalyst housing and includes a CUC catalyst therein;
a first housing surrounding the multiple catalyst bed;
a double pipe including a first pipe that is connected to a front end of the APC housing and a rear end of a three-way catalyst (TWC) housing, and a second pipe that surrounds the first pipe and is connected to the first housing; and
an exhaust-gas flow unit connected to a rear end of the CUC housing,
wherein at least one perforation is formed in inner and outer surfaces of the first pipe, inner and outer surfaces of the APC housing, inner and outer surfaces of the SCR catalyst housing, and an inner surface of the CUC housing.

2. The lean-burn engine after-treatment system of claim 1, wherein the second pipe comprises a first line extending in a direction parallel to a longitudinal direction of the first pipe, and a second line extending to have an increased diameter and connected to the first housing.

3. The lean-burn engine after-treatment system of claim 2, wherein the at least one perforation of the first pipe is surrounded by the first line.

4. The lean-burn engine after-treatment system of claim 1, wherein the exhaust-gas flow unit comprises: an exhaust-gas inlet part connected to the rear end of the CUC housing; an exhaust-gas joining part; and an exhaust-gas outlet part.

5. The lean-burn engine after-treatment system of claim 4, wherein the exhaust-gas inlet part extends in a longitudinal direction of the CUC housing.

6. The lean-burn engine after-treatment system of claim 5, wherein the exhaust-gas joining part extends inwards in a direction perpendicular to a longitudinal direction of the exhaust-gas inlet part.

7. The lean-burn engine after-treatment system of claim 4, wherein the exhaust-gas outlet part extends in a direction parallel to the longitudinal direction of the exhaust-gas inlet part.

8. The lean-burn engine after-treatment system of claim 6, wherein the exhaust-gas inlet part and the exhaust-gas joining part are connected in a curved shape.

9. The lean-burn engine after-treatment system of claim 1, wherein a mat of a mesh structure is located on the at least one perforation of the inner surface of the SCR catalyst housing or on the at least one perforation of the inner surface of the CUC housing.

10. The lean-burn engine after-treatment system of claim 1, wherein the first pipe or the CUC housing is made of an aluminum material.

11. The lean-burn engine after-treatment system of claim 1, wherein a central axis of the at least one perforation of the APC housing coincides with that of the at least one perforation of the inner surface of the SCR catalyst housing.

12. The lean-burn engine after-treatment system of claim 1, wherein a size of the at least one perforation of the APC housing is equal to that of the at least one perforation of the inner surface of the SCR catalyst housing.

13. The lean-burn engine after-treatment system of claim 1, wherein a central axis of the at least one perforation of the outer surface of the SCR catalyst housing coincides with that of the at least one perforation of the inner surface of the CUC housing.

14. The lean-burn engine after-treatment system of claim 1, wherein a size of the at least one perforation of the outer surface of the SCR catalyst housing is equal to a size of the at least one perforation of the inner surface of the CUC housing.

15. The lean-burn engine after-treatment system of claim 1, wherein the at least one perforation is formed in an entire region of the APC housing, the inner and outer surfaces of the SCR catalyst housing, or the inner surface of the CUC housing.

16. The lean-burn engine after-treatment system of claim 1, wherein the at least one perforation of the inner and outer surfaces of the APC housing, the at least one perforation of the inner surface of the SCR catalyst housing, the at least one perforation of the outer surface of the SCR catalyst housing, or the at least one perforation of the inner surface of the CUC housing have inclined shapes.

17. The lean-burn engine after-treatment system of claim 1, wherein the second pipe or the first housing is surrounded by a heat insulating material.

18. The lean-burn engine after-treatment system of claim 17, wherein the heat insulating material is a silica material.

* * * * *